Feb. 19, 1929.
N. M. LOWER
1,702,908
SELF CLEANING TANK
Filed Dec. 12, 1925
2 Sheets-Sheet 1
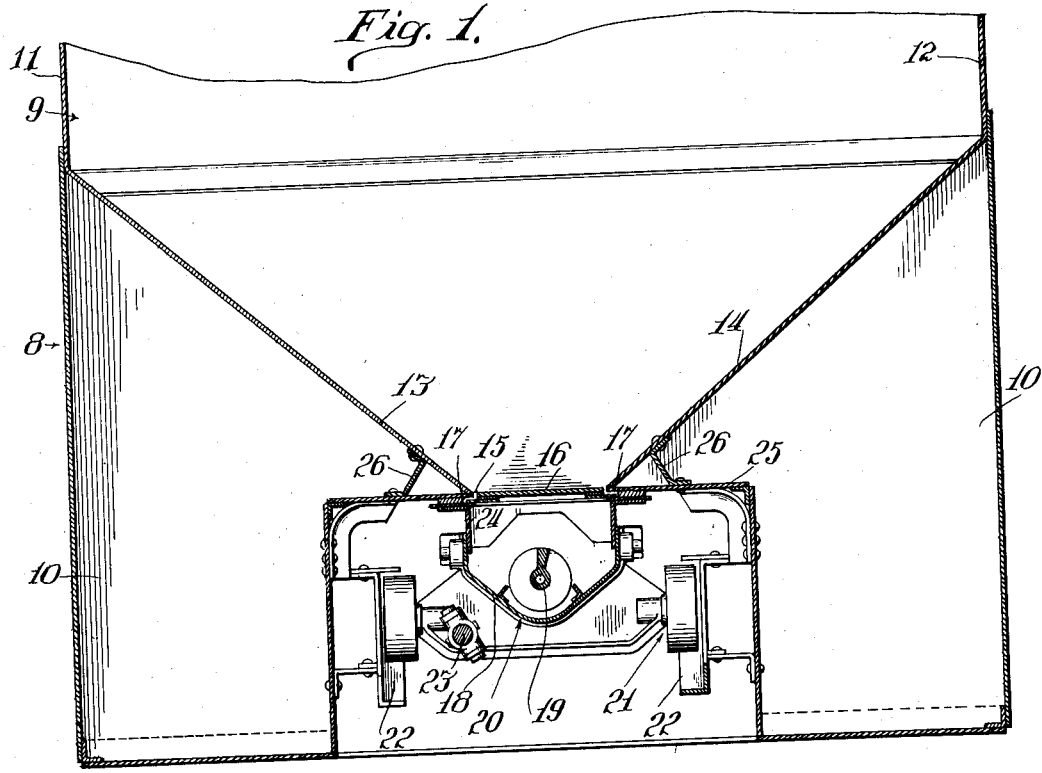
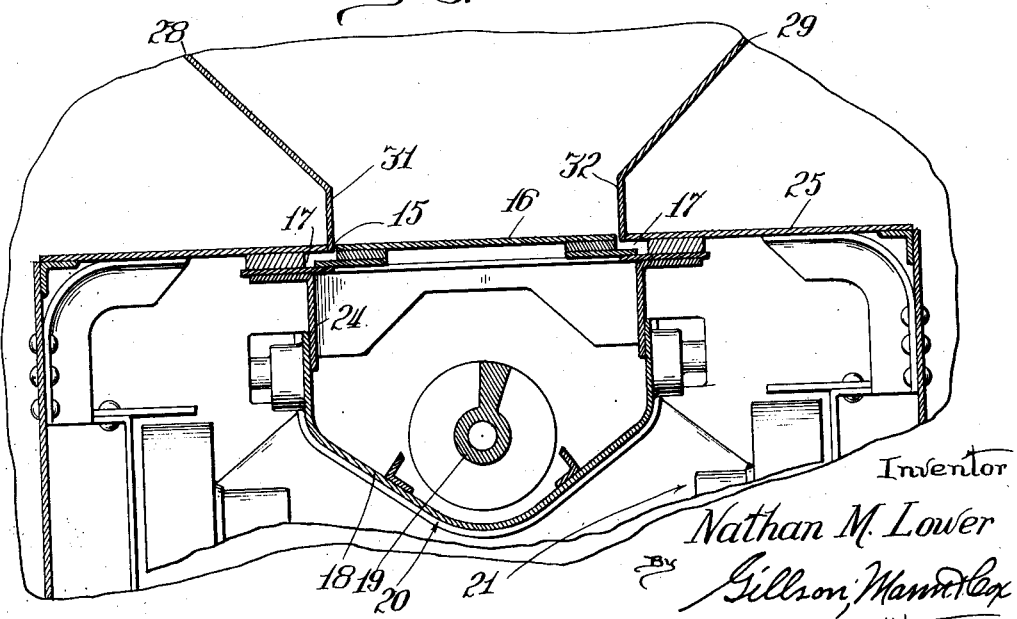
Inventor
Nathan M. Lower
By Gillson, Mann & Cox
Attorneys

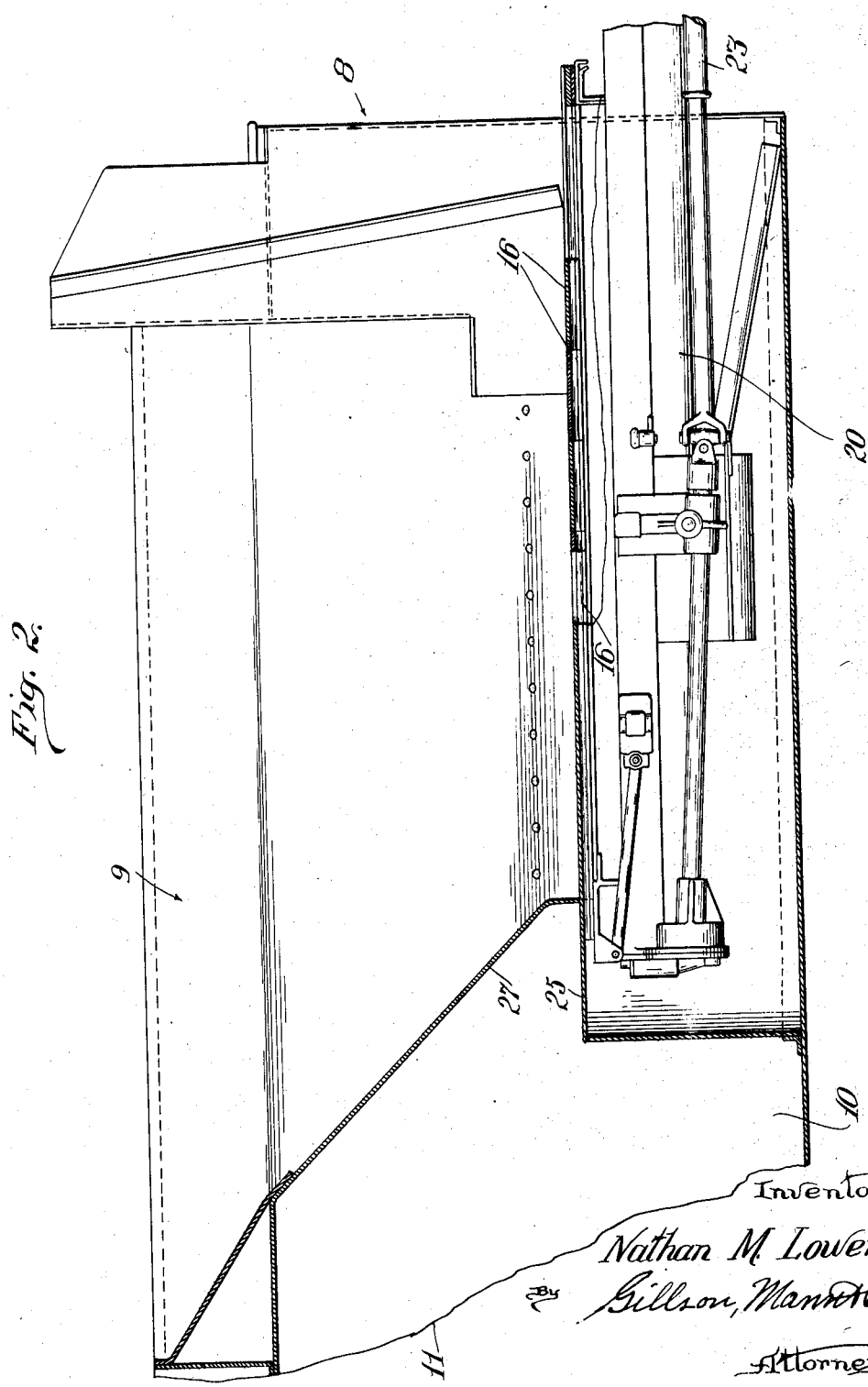

Patented Feb. 19, 1929.

1,702,908

UNITED STATES PATENT OFFICE.

NATHAN M. LOWER, OF PITTSBURGH, PENNSYLVANIA, ASSIGNOR, BY MESNE ASSIGNMENTS, TO THE STANDARD STOKER COMPANY INC., OF NEW YORK, N. Y., A CORPORATION OF DELAWARE.

SELF-CLEANING TANK.

Application filed December 12, 1925. Serial No. 75,030.

This invention relates to tender construction and fuel transferring mechanism for locomotives.

One of the objects of the invention is the provision of a new and improved construction for the fuel compartment or tank of a locomotive tender whereby the fuel contained therein will be automatically fed to the stoker conveyor without very materially decreasing the capacity of the conventional fuel tank.

Another object of the invention is the provision of a new and improved construction for the fuel tank of a locomotive tender that is cheap to manufacture, simple in construction, efficient, reliable, rugged, and that is so constructed that all or substantially all the fuel will be automatically delivered to the stoker conveyor mechanism as required.

Other and further objects and advantages of the invention will appear from the following description taken in connection with the accompanying drawings, in which Fig. 1 is a transverse section through the tender showing the invention in position therein;

Fig. 2 is a longitudinal section thereof, with parts removed and parts broken away;

Fig. 3 is a transverse vertical section of a tender showing a modified form of construction.

With the advent of stoker mechanism it has been necessary to so design the walls of the fuel tank of the tender that the fuel will be automatically delivered to the conveyor trough of the stoker mechanism beneath the tender.

It has been proposed to employ locomotive fuel tanks having sloping side sheets or walls extending to the top of the tank, and in order to provide sufficient space to carry the required amount of fuel the sheets or walls have been set back from the discharge opening in the bottom of the tank. This arrangement is objectionable in that the ledge formed above the opening constitutes an obstruction to the free movement of fuel through said opening.

It has also been proposed to construct the walls of the fuel tank integral with the conveyor trough but this too is objectionable in that it does not permit a movement of the conveyor trough relative to the tender.

In these efforts to employ sloping side walls for the fuel tank the height of the sloping walls and steep angle at which they have been placed have reduced the capacity of the tank to too great an extent. Where, as at present, the locomotives are exceedingly large and consume enormous quantities of fuel, the capacity of the fuel tank on the tender is an important consideration. The present invention seeks to eliminate these difficulties.

Reference now being had to Figs. 1 and 2 of the drawings, which illustrate one embodiment of the invention, the reference character 8 designates a tender comprising a fuel compartment or tank 9 and a water compartment or tank 10 extending about the sides and rear of the fuel tank, in the usual manner.

The fuel tank is provided with side walls 11 and 12 the lower portions of which are preferably inclined to form the sloping side sheets 13 and 14. The lower edges of these sloping side sheets are in spaced relation and define the side edges of an opening 15 through which the fuel is adapted to be discharged.

The opening 15 is adapted to be closed by a plurality of panels or boards 16 which are adapted to be slidably mounted in guideways 17 beneath the ends of said side walls. Since these panels or boards are of the conventional type it is not thought necessary to further describe the details of the same. They are adapted to be slid along the guideways for the purpose of permitting the fuel to pass through the opening 15 in the usual manner.

A fuel conveyor 20 is mounted beneath the opening 15. This conveyor is the conventional type comprising a trough 18 open at its upper side and in which is mounted the screw conveyor 19 for transferring the fuel from the tender to the locomotive. The conveyor is mounted in the usual manner on a truck 21 which is supported by the tracks 22. The conveyor screw is operated by a shaft 23 in a manner well known in the art.

An angle ring 24 has its vertical flange engaging within the trough 18 and has its horizontal flange engaging beneath the guideways 17. This angle ring prevents the fuel from escaping over the upper ends of the trough. In other words, it guides the fuel passing through the opening 15 into the trough 18. The width of the opening 15 is preferably slightly less than the distance between the vertical flanges of the ring 24 whereby fuel will not be interrupted in its passage through the opening 15 into the trough 18. The lower ends of the sloping side sheets 13 and 14 are rigidly secured to the wall or deck 25 in any suitable manner as by means of braces 26.

In order to obtain a maximum capacity for the fuel and at the same time employ the sloping side sheets 13 and 14 for automatically feeding fuel to the trough 18 these sheets are arranged to extend only a short distance vertically on the side walls. They are preferably arranged at an angle greater than the angle of repose of the fuel but at the same time not so great but that the vibration of the walls, due to the travel of the tender, will cause the fuel to travel down the same.

The lower portion of the rear wall 27 of the fuel tank is also arranged at an angle for directing the coal into the rear end of the trough 18. This wall is also preferably arranged at an angle greater than the angle of repose but at such an angle that the vibration of the tender will cause the coal to slide down the inclined surface as in the previous construction.

The form of the device shown in Fig. 3 differs from that just described in that the lower portion of the side walls 28 and 29 are provided with vertical extensions or flanges 31 and 32 which engage in the opening 15 thereby dispensing with braces and eliminating the necessity for rivets the heads of which tend to prevent the free flow of fuel down the inclined side sheets. The flanges form a throat through which the fuel passes into the trough 18 of the conveyor. As in the former construction the distance between the lower sections 31 and 32 of the wall is slightly less than the width of the trough whereby the fuel will not be interrupted in its flow from the fuel tank into the conveyor.

In both forms of the device the sloping side sheets extend vertically only a short distance on the side walls of the fuel tank whereby a maximum capacity for fuel is obtained.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. In combination, a locomotive tender comprising a fuel compartment and a water compartment extending about the fuel compartment, said fuel compartment having sloping side and rear walls forming a partition between said compartments, the lower edges of said walls defining an opening through which fuel is adapted to pass, a fuel conveyer removably mounted beneath said tender and said opening for receiving said fuel, said walls being arranged at an angle but slightly greater than the angle of repose of the fuel normally used, whereby the vibration of the tender will cause the fuel to automatically slide down into said conveyer, and a plurality of slide plates across said opening and slidable along the same.

2. In combination, a locomotive tender comprising a fuel compartment and a water compartment extending about the fuel compartment, said fuel compartment having sloping side and rear walls forming a partition between said compartments, substantially vertical walls extending upwardly from the upper portion of said sloping walls, the lower edges of said sloping walls defining a fuel opening, a fuel conveyer trough removably mounted beneath said opening for receiving fuel from said fuel compartment, the width of the mouth of said trough being not less than the width of said opening, and the angle of said sloping walls varying but slightly from the angle of repose of the fuel normally contained in said tender.

In testimony whereof I affix my signature.

NATHAN M. LOWER.